(12) United States Patent
Wray

(10) Patent No.: US 6,332,366 B1
(45) Date of Patent: Dec. 25, 2001

(54) CORIOLIS FLOW METER WITH ADJUSTABLE EXCITATION PHASE

(75) Inventor: Troy Wray, Stonehouse (GB)

(73) Assignee: ABB Kent-Taylor Limited, Gloucestershire (GB)

( * ) Notice: Subject to any disclaimer, the term of this patent is extended or adjusted under 35 U.S.C. 154(b) by 0 days.

(21) Appl. No.: 09/216,694

(22) Filed: Dec. 18, 1998

(30) Foreign Application Priority Data

Dec. 19, 1997 (GB) ................................................ 9726908

(51) Int. Cl.$^7$ ........................................................ G01F 1/84
(52) U.S. Cl. ............................. 73/861.356; 73/861.357
(58) Field of Search ........................ 73/861.355, 861.356, 73/861.357

(56) References Cited

U.S. PATENT DOCUMENTS

| | | | |
|---|---|---|---|
| 3,485,098 | 12/1969 | Sipin | 73/861.355 |
| 3,675,485 | * 7/1972 | Loeb | 73/382 R |
| 3,914,999 | * 10/1975 | Grandchamp | 73/861.25 |
| 4,081,679 | 3/1978 | Cohn | 250/338.1 |
| 4,164,146 | * 8/1979 | DuVall et al. | 73/304 R |
| 4,420,983 | 12/1983 | Langdon | 73/861.18 |
| 4,458,524 | * 7/1984 | Meador et al. | 73/61.43 |
| 4,622,858 | 11/1986 | Mizerak | 73/861.357 |
| 4,655,089 | 4/1987 | Kappelt et al. | 73/861.356 |
| 4,801,897 | 1/1989 | Flecken | 73/861.357 |
| 4,843,346 | * 6/1989 | Heyman et al. | 73/763 |
| 4,934,195 | 6/1990 | Hussain | 73/861.355 |
| 5,363,706 | 11/1994 | Lew | 73/861.355 |
| 5,425,277 | 6/1995 | Lew | 73/861.355 |
| 5,804,742 | * 9/1998 | Rademacher-Dubbick | 73/861.357 |

* cited by examiner

Primary Examiner—Harshad Patel
(74) Attorney, Agent, or Firm—Larson & Taylor, PLC

(57) ABSTRACT

In a coriolis flow meter, two drivers are provided and a measure of mass flow rate derived from the adjustment of the input signals to each driver required to achieve a desired phase shift in the output. This may give higher accuracy compared to conventional meters in which the phase shift is simply measured, and may also enable determination of other characteristics of the fluid.

18 Claims, 2 Drawing Sheets

CORIOLIS FLOW METER WITH ADJUSTABLE EXCITATION PHASE

Coriolis flow meters have been used for many years to obtain accurate mass flow measurements. The principle behind such flow meters is that a transducer is employed to apply vibration to a conduit containing the fluid whose mass flow rate is to be measured and the vibration in the conduit is measured by two spaced apart sensors, typically either side of the source of vibration. Throughout this specification, the term fluid is intended to encompass both homogeneous fluids such as liquids or gasses and non-homogeneous fluids such as slurries, suspensions or particulate media. In the absence of a fluid flow, the phase of vibration at each sensor location will be approximately the same. However, when a fluid flows through the conduit, there will tend to be a lag in the phase of the upstream sensor and a lead in the phase of the downstream sensor. From the phase difference, a measure of the mass flow rate can be obtained.

Examples of flow meters operating of this principle can be found in U.S. Pat. No. 4,422,338, U.S. Pat. No. 5,423,221, U.S. Pat. No. 4,856,346, U.S. Pat. No. 5394758, U.S. Pat. No. 4,192,184 and U.S. re-issue Pat. No. 31,450, the disclosures of each of which are herein incorporated by reference.

The inventor has appreciated that a problem with conventional mass-flow meters is the need to measure the small phase differences accurately; typically the phase differences induced are only of the order of a few degrees.

The inventor has proposed that the excitation applied to a flow conduit be adjusted to modify the measured phase difference, for example to achieve or maintain a desired phase difference between sensors (preferably a null phase difference) and the mass flow rate derived from the adjustment applied. In this way, it may be easier to obtain accurate measurement as detection of a particular phase difference at a single point may be more accurately achieved than accurate measurement over a range of possible phase differences. The technique can be employed to extend the range or increase the accuracy of measurement, by effectively reducing the range over which a phase difference must be measured.

Accordingly, in one aspect, the invention provides apparatus for obtaining a measure of mass flow rate in a fluid conduit comprising: excitation means for applying vibration to a portion of the conduit; sensor means for detecting a measure of phase difference in the vibration at spaced apart points in the flow conduit; wherein the excitation applied by said excitation means is adjustable to compensate for variation in said phase difference caused by flow of fluid through the conduit;.

The apparatus preferably includes control means for adjusting the excitation provided by the excitation means and preferably further includes means for determining a measure of the mass flow rate through the conduit based on a measure of the adjustment provided by said control means.

Preferably the excitation means comprises two (or more) spaced apart transducers, preferably electromagnetic transducers, and the adjusting means comprises means for adjusting the relative phase and/or amplitude, preferably at least the relative phase, of excitation signals supplied to the transducers.

Preferably the apparatus is arranged so that the control means maintains a substantially constant phase difference, preferably a null phase difference at the sensor locations; this enables an accurate measure of mass flow to be derived directly from the adjustment applied to the adjustment means.

Alternatively, the phase difference may be measured, and the mass flow derived from both a measure of the adjustment applied to the excitation means and the measured phase difference. For example, the excitation may be adjusted in discrete steps and a correction factor may be determined from the measured phase difference.

Another benefit of the invention is that the calibration of the meter can be checked by comparing the measured phase difference with a stored or predicted phase difference for a given adjustment applied to said excitation. For example, a measure of mass flow rate may be determined based on the measured phase difference with no compensating adjustment, and compared to a measure of mass flow rate obtained by adjusting the excitation to produce a substantially null phase difference; if the measures do not agree, this suggests a fault or calibration shift in the meter. Thus, the apparatus may include means for verifying accuracy of the meter based on said measure of adjustment and a measure of the phase difference, preferably based on a stored or calculated relationship between the two.

The inventor has appreciated that the measured phase shift may be a non-linear function of the applied phase shift, depending on further physical properties of the fluid, particularly viscosity. Thus a further benefit of the invention is that it may be possible to obtain a measure of a further property of the fluid, for example viscosity, based on the variation of measured phase shift with applied phase shift. The method preferably includes obtaining a measure of phase shift for a plurality of values of applied excitation and deriving a property of the fluid from the measured variation of phase shift with applied excitation.

The invention also extends to corresponding methods of operation. An embodiment of the invention will now be described, by way of example, with reference to the accompanying drawings in which.

Figure 1:
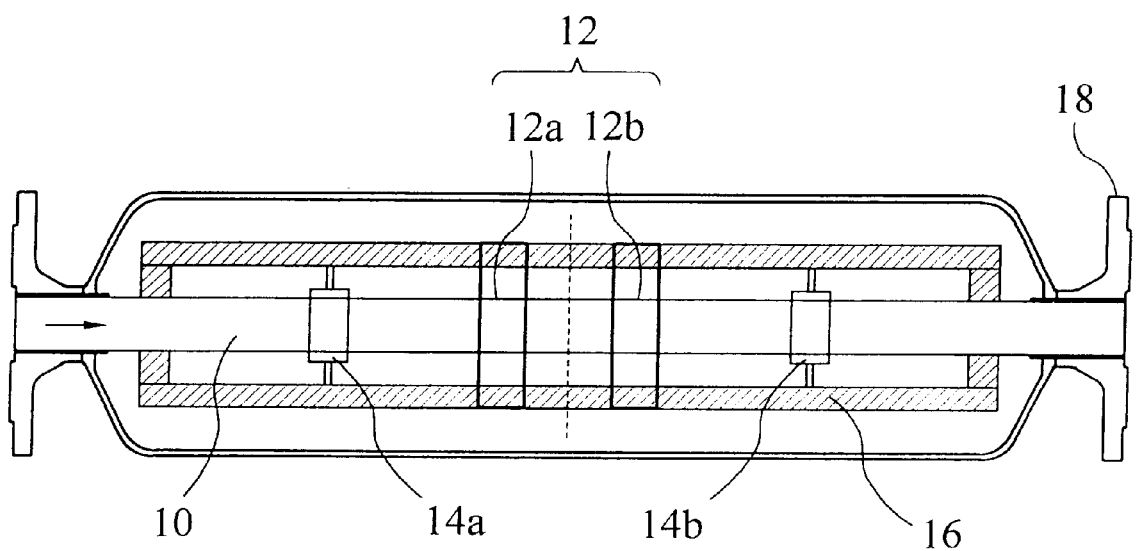
FIG. 1 is a schematic diagram of a flowmeter according to the invention.

Referring to FIG. 1, a flow meter comprises a conduit 10 provided with an electromagnetic exciter 12 and having spaced apart sensors 14a, 14b located respectively on upstream and downstream sides of the exciter. The conduit is coupled to a rigid housing or support tube 16, which ensures that the portion of conduit which is vibratable is well defined. Coupling flanges 18 will usually be provided for joining to adjacent pipework.

The basic physical arrangement described above is purely exemplary; a design based on any suitable known arrangement may be employed.

Figure 2:
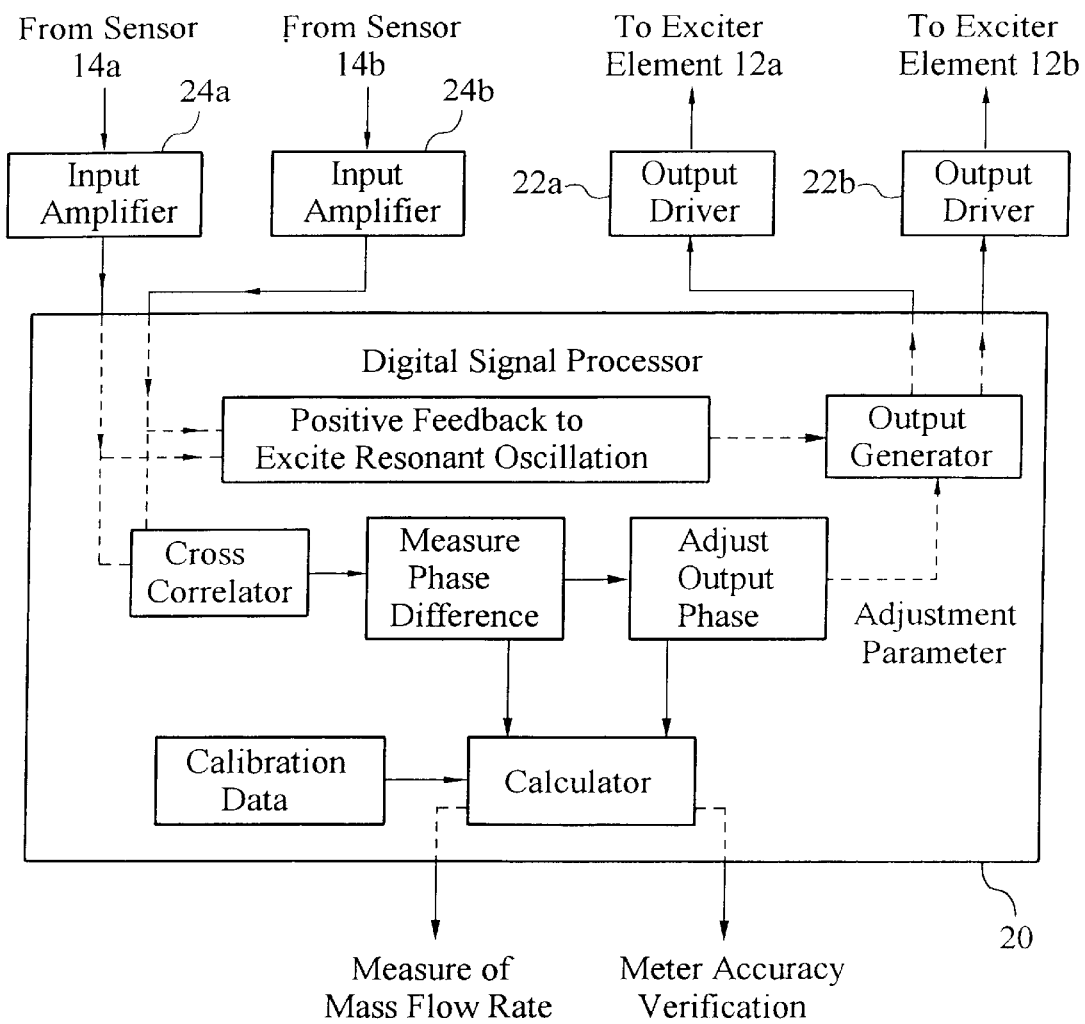
FIG. 2 is a schematic block diagram of the control arrangement used for the apparatus of FIG. 1.

An important difference from conventional arrangements, however, is that the exciter 12 of this embodiment comprises two separate spaced apart exciter elements 12a, 12b. Each of these elements is separately controllable. Thus, by adjusting the relative amplitude or phase (preferably at least the phase) of the signals fed to each exciter element, the phase detected by the sensors may be positively adjusted. This may be employed to compensate for phase shift caused by mass flow, as will be described further below with reference to the control arrangement schematically illustrated in FIG. 2.

In this embodiment, control of the apparatus is effected primarily by means of a digital signal processor 20. This drives the exciter elements 12a, 12b by means of respective output drivers 22a, 22b and receives inputs from the sensors 14a, 14b by means of respective input amplifiers 24a, 24b.

As schematically illustrated, the digital signal processor implements a number of functions, as will be described further below.

Firstly, it applies positive feedback from the sensor elements to the exciter elements to excite and maintain resonant oscillation of the conduit. This is essentially a simple amplification function, preferably ignoring any small phase differences in the inputs from the sensors, but simply taking an average of the two inputs and preferably providing a basic output drive signal of approximately the right phase frequency and amplitude to drive the exciter elements to maintain resonant oscillation. The excitation is preferably arranged to excite a preferred mode of vibration or preferred combination of modes of vibration; this may include frequency or phase selection. Advantageously a digital signal processor is employed, enabling selection of a desired proportion of modes, and switching between modes; in combination with adjustment of applied phase, this may facilitate determination of a measure of one or more further physical properties.

Fine adjustment of the phase, and optionally amplitude, of the signals fed to each individual exciter element is preferably performed subsequently in a separate output generator functional element which receives the basic output signal and information concerning the individual phase adjustments to be made.

In one arrangement, the apparatus is arranged to adjust the excitation to obtain a null phase difference between the sensors; this has the benefit that the actual phase measurement need not be calibrated. Higher accuracy may be obtained because a null point may be more accurately determined than the absolute value of a phase difference.

In an alternative arrangement, the apparatus is arranged to derive a measure of mass flow from either or both of the applied phase shift and the measured phase shift. This has the benefit that rapidly changing flow rates can be accommodated (where the flow rate is determined from the applied phase shift alone, there will be delays before the apparatus tracks the flow rate and the measured phase shift becomes zero). Even though this requires measurement of the phase difference, accuracy may be improved because measurement may be required over a smaller range.

In a further alternative arrangement, the "null" point is altered, for example modulated about a zero value, or cycled through a plurality of discrete values. In this way, a measure of variation of measured phase shift with applied phase shift can be obtained, and this may provide information concerning other physical properties of the fluid. For example, the ratio of the output phase to the applied adjustment may provide a useful measure of physical properties of the fluid, such as viscosity.

As an alternative to positive feedback to generate the oscillation, the signal processor may include an element arranged to produce an oscillating signal at a determined frequency. Resonant oscillation is, however, preferred, as the conduit behaviour may be more easily controlled and predictable. In addition, it is possible to measure the resonant frequency and derive therefrom a measure of the mass and hence density of the fluid in the conduit. A further possibility is for the resonant circuit to be incorporated in a phase-locked loop.

The digital signal processor also includes means for obtaining a measure of the phase difference in the signals from the sensors 14a and 14b. In this embodiment, this is achieved by cross correlation. Assuming we have two sinusoidal signals A and B differing in phase by predetermined angle α these can be written as follows (neglecting any absolute phase offset):

$$A = a \sin \omega t \quad (1)$$

$$B = b \sin (\omega t + \alpha) \quad (2)$$

Then the cross product A ⊗ B can be written as $$(3) \quad A \otimes B = ab \int_0^{2\pi} \sin \omega t \sin(\omega t + \alpha) dt$$

$$A \otimes B = ab/2 \cos \alpha \quad (4)$$

Thus, the phase difference α may be determined by integrating the product of the two signals. In practice, of course, this integration will be performed numerically on a discrete series of samples, preferably 16 bit samples. For example with a resonant frequency of the order of 100 hz and a sampling frequency of the order of 40 kHz, there will be approximately 400 samples per cycle. The integration may be performed over a number of cycles to increase accuracy. The coefficients a and b may be determined by cross-correlating each signal with itself.

It has been appreciated by the inventor that the phase measured using cross correlation is most sensitive to small changes in the phase when the phase difference is approximately 90°(+/−n×180°). At this point, cos α, which is proportional to the value of the integral should theoretically be zero and has maximum gradient, so any small change will be readily noticeable. Thus, to improve accuracy, it is preferred that the apparatus is configured so that the phase difference measured by cross correlation is approximately 90°. This can be achieved by inserting a phase delay in the input from at least one of the sensors, or in a preferred implementation simply by performing the cross correlation using effectively shifted sample data. Alternatively, the sensors may be configured to provide an in-built phase offset in their outputs. Since the resonance frequency can be determined and the sampling frequency is known, it is possible to determine the number of samples per cycle, N. Then by assuming the signals are in phase in the unperturbed condition of the conduit, effectively shifting the data returned from one sensor by N/4 samples, the value of the integral will be approximately zero at a null phase difference. This technique is applicable to other applications of cross correlation to measure phase difference.

Note that the data need not be physically moved to effect a shift; in a preferred implementation, the data is simply read out from memory starting at an offset point from the actual start of sampling. For example, the first N/4 samples from one sensor may be ignored, based on the measured phase difference, the phase of output signals sent to the output drivers is adjusted to tend to return the measured phase to a desired value. The measured phase difference and a measure of the applied adjustment (for example a value for the phase difference between the output signals) are fed to a calculator, which also receives calibration data. From this, a value for the mass flow rate in the conduit can be determined. In addition, by monitoring the change in measured phase with changes in the drive signals, faults or drifts in the calibration of the meter may be detected. Meter accuracy verification may be performed in a number of ways, and may be performed either continuously or intermittently.

As mentioned briefly above, a value for the density of the fluid in the conduit may also be calculated from a measure of the resonant frequency of the pipe and further calibration data.

In the above described embodiment, a digital signal processor has been used to implement the majority of the functions of the apparatus. This provides a convenient, flexible and readily adaptable arrangement. However, it will be appreciated that each of the above functions may be performed using analogue hardware, or a combination of analogue hardware and digital signal processing.

For example, it is relatively straightforward to implement positive feedback using an analogue amplifier circuit.

Indeed, this function can readily be separated from the digital signal processor and a conventional analogue feedback circuit arranged to drive a single exciter element may be provided, with the digital signal processor serving to make fine adjustments to the phases of the signals supplied to each of the individual exciter elements 12a, 12b.

Analogue phase-difference detection circuitry is also known, and may be substituted for the cross-correlation phase difference detection described above.

The meter accuracy verification function need not be provided, and this can lead to simpler apparatus in which it is only necessary to detect a null (or other predetermined) phase difference, rather than to obtain a measure of the phase difference.

As an alternative to two separate sensor elements, a single composite sensor providing a direct output of phase difference may be employed. This can readily be interfaced to simpler processing circuitry. As an example of a composite sensor, a sensor having two detector coils mechanically coupled to two respective sensing points on the conduit, but having windings connected in series but in opposite sense, so that the net output is equal to the difference between the sensor readings; this will be substantially null with no phase shift. As a further example, a mechanical coupling may be provided between the two sensing points, and a single sensor may be arranged to measure deformation of the mechanical coupling.

In place of separate driver coils 12a, 12b, a single exciter element may be employed, with the phase adjustment effected by, for example, altering the physical coupling of the driver element to the conduit. Indeed, any arrangement in which the phase difference between the sensor signals can be controlled may be employed; the arrangement of two spaced apart coils is however particularly convenient.

The apparatus is preferably calibrated empirically, by passing a known mass flow rate through the conduit and noting the phase adjustment and/or measured phase difference, preferably for a number of different mass flow rates.

Each feature described may be independently provided, unless otherwise stated. The appended abstract is herein incorporated by reference.

What is claimed is:

1. Apparatus for obtaining a measure of mass flow rate in a fluid conduit comprising:
   excitation means for applying vibration to a portion of the conduit;
   sensor means for detecting a measure of phase difference in the vibration at first and second mutually spaced apart points in the flow conduit; and wherein
   the excitation applied by said excitation means is adjustable to compensate for variation in said phase difference caused by flow of fluid through the conduit and wherein adjustment of said excitation is selected to alter said phase difference.

2. Apparatus according to claim 1, further comprising control means for adjusting the excitation provided by the excitation means.

3. Apparatus according to claim 2 including means for determining a measure of the mass flow rate through the conduit based on a measure of the adjustment provided by said control means.

4. Apparatus according to claim 3 wherein the control means is arranged substantially to maintain a predetermined phase difference, said measure of the mass flow rate being based essentially on a measure of said adjustment.

5. Apparatus according to claim 3 wherein the control means is arranged to permit variation of the measured phase difference within a predetermined range, said measure of the mass flow rate being based on the measure of said adjustment and a measure of said phase difference.

6. Apparatus according to claim 3 further comprising means for deriving a measure of the accuracy of the apparatus based on the measure of said adjustment and said measure of phase difference.

7. Apparatus according to claim 1, wherein the excitation means comprises two spaced apart exciter elements.

8. Apparatus according to claim 7, including control means for adjusting the excitation provided by the excitation means, wherein the control means is arranged to drive each exciter element independently.

9. Apparatus according to claim 1, wherein the sensor means comprises two sensor elements, each providing a signal representation of phase at one of said spaced apart points.

10. Apparatus according to claim 9 including cross-correlation means arranged to determine a measure of said phase difference based on the results of cross-correlation of signals from each of the sensors.

11. Apparatus according to claim 10 arranged to apply an effective phase shift to at least one of the sensor signals to increase the sensitivity of the cross-correlation to changes in the phase difference.

12. Apparatus according to claim 11 wherein the effective phase shift is selected so that the phase difference between the signals to be cross-correlated is approximately 90° (modulo 180°).

13. A method according to claim 11 further comprising determining a measure of the accuracy of the meter based on the measured phase difference and the measure of the amount of the amount of said adjusting.

14. Apparatus according to claim 10 wherein the sensor signals are stored as discrete samples and an offset corresponding to the effective phase shift is determined based on a value for the number of samples in a signal period.

15. A method of obtaining a measure of mass flow rate in a fluid conduit comprising applying vibration to a portion of the conduit;
   detecting a measure of phase difference in the vibration at first and second mutually spaced apart points in the flow conduit;
   adjusting the excitation applied to the conduit to compensate for variation in said phase difference caused by flow of fluid through the conduit; and
   obtaining a measure of the mass flow rate based on at least a measure of the amount of adjustment and wherein adjustment of said excitation is selected to alter said phase difference.

16. A method according to claim 15 wherein said measured phase difference is maintained substantially constant and the determination is based essentially on said measure of said adjusting.

17. A method according to claim 15 wherein the determination of the measure of the flow rate is based on the measure of the amount of said adjusting and the measured phase difference.

18. A method of verifying the accuracy of a mass flow meter which includes means for applying vibration to a portion of a conduit and means for detecting a phase difference in vibration at first and second mutually spaced apart locations in the conduit, the method comprising adjusting the excitation applied to the conduit and comparing a measured value of said phase difference with a predicted value of phase difference and wherein adjustment of said excitation is selected to alter said phase difference.

* * * * *